United States Patent
Wilson

(10) Patent No.: US 10,175,058 B2
(45) Date of Patent: Jan. 8, 2019

(54) METHODS, DEVICES AND MAP DATABASES FOR GREEN ROUTING

(75) Inventor: Christopher Kenneth Hoover Wilson, Emerald Hills, CA (US)

(73) Assignee: TOMTOM GLOBAL CONTENT B.V., Amsterdam (NL)

(*) Notice: Subject to any disclaimer, the term of this patent is extended or adjusted under 35 U.S.C. 154(b) by 446 days.

(21) Appl. No.: 13/122,750

(22) PCT Filed: Dec. 22, 2008

(86) PCT No.: PCT/US2008/013956
§ 371 (c)(1),
(2), (4) Date: Apr. 6, 2011

(87) PCT Pub. No.: WO2010/074668
PCT Pub. Date: Jul. 1, 2010

(65) Prior Publication Data
US 2012/0022781 A1    Jan. 26, 2012

(51) Int. Cl.
*G01C 21/34* (2006.01)

(52) U.S. Cl.
CPC ......... *G01C 21/3469* (2013.01); *G01C 21/34* (2013.01); *G01C 21/3415* (2013.01);
(Continued)

(58) Field of Classification Search
CPC .... G01C 21/30; G01C 21/34; G01C 21/3415; G01C 21/3446; G01C 21/3453; G01C 21/3461; G01C 21/3469; G01C 21/3492
(Continued)

(56) References Cited

U.S. PATENT DOCUMENTS 5,913,917 A * 6/1999 Murphy .................. 701/123
6,005,494 A * 12/1999 Schramm ............. 340/995.19
(Continued)

FOREIGN PATENT DOCUMENTS

EP     1 045 224       10/2000
EP     1096229 A1      5/2001
(Continued)

OTHER PUBLICATIONS

Machine translation of EP0145224A2.*
(Continued)

*Primary Examiner* — Thomas G Black
*Assistant Examiner* — Sze-Hon Kong

(57) ABSTRACT

In at least one embodiment, a method is disclosed that includes determining algorithmically a a plurality of vehicle cost values for traveling a plurality of road segments in a vehicle based at least in part on vehicle cost data derived at least in part from position derivative data obtained from at least one vehicle that traveled the road segments (S1); associating each of the plurality of road segments with at least one of the vehicle cost values (S2); and storing the determined vehicle cost values in a memory device (S3). In at least one embodiment, a method for determining a route of travel from a first location to a second location is disclosed. Other embodiments include a map database, storable on a storage medium; a device including a memory (230) storing a map database, a processor (210) and an output device (260); and a device for use in a vehicle, where the device includes a GPS receiver (250), a memory (230) and a processor (210).

13 Claims, 5 Drawing Sheets

(52) U.S. Cl.
CPC ..... *G01C 21/3446* (2013.01); *G01C 21/3453* (2013.01); *G01C 21/3461* (2013.01); *G01C 21/3492* (2013.01)

(58) Field of Classification Search
USPC ....... 701/410, 411, 414, 415, 423, 425, 533; 703/23, 25, 410, 414, 424
See application file for complete search history.

(56) References Cited

U.S. PATENT DOCUMENTS

| | | | |
|---|---|---|---|
| 6,059,686 A | | 5/2000 | Takahashi |
| 6,230,099 B1 | | 5/2001 | Fabian |
| 7,353,111 B2* | | 4/2008 | Takahashi et al. ........... 701/431 |
| 7,783,417 B2* | | 8/2010 | Vavrus ............... G01C 21/3469 701/423 |
| 8,175,795 B2* | | 5/2012 | Narita ................... B60W 40/12 340/995.19 |
| 8,606,512 B1* | | 12/2013 | Bogovich ............. G06Q 40/08 340/995.28 |
| 2003/0060977 A1 | | 3/2003 | Jijina et al. |
| 2004/0073361 A1* | | 4/2004 | Tzamaloukas ..... G01C 21/3691 701/414 |
| 2005/0021226 A1 | | 1/2005 | Kustosch |
| 2005/0107951 A1* | | 5/2005 | Brulle-Drews et al. ...... 701/209 |
| 2006/0122846 A1* | | 6/2006 | Burr ................... G01C 21/3492 342/357.31 |
| 2006/0149466 A1 | | 7/2006 | Kikuchi et al. |
| 2006/0178824 A1* | | 8/2006 | Ibrahim ........................ 701/211 |
| 2006/0278449 A1* | | 12/2006 | Torre-Bueno ............ B60K 6/46 180/65.29 |
| 2007/0005237 A1* | | 1/2007 | Needham ........... G01C 21/3469 701/414 |
| 2007/0038362 A1* | | 2/2007 | Gueziec ......................... 701/117 |
| 2007/0076584 A1* | | 4/2007 | Kim ....................... G08G 1/092 370/206 |
| 2007/0083327 A1* | | 4/2007 | Brice et al. ................... 701/210 |
| 2007/0100537 A1 | | 5/2007 | Parikh et al. |
| 2007/0106465 A1* | | 5/2007 | Adam ................. G01C 21/3492 701/533 |
| 2007/0112475 A1* | | 5/2007 | Koebler .................... B60L 3/12 701/1 |
| 2007/0162222 A1* | | 7/2007 | Endo et al. ................... 701/209 |
| 2007/0225900 A1 | | 9/2007 | Kropp |
| 2008/0004797 A1* | | 1/2008 | Katzer .......................... 701/201 |
| 2008/0004802 A1 | | 1/2008 | Horvitz |
| 2008/0071472 A1 | | 3/2008 | Yamada |
| 2008/0114534 A1 | | 5/2008 | Yamazaki et al. |
| 2008/0114542 A1* | | 5/2008 | Nambata et al. ............. 701/209 |
| 2008/0125958 A1* | | 5/2008 | Boss .................... G06Q 10/047 701/123 |
| 2008/0133120 A1* | | 6/2008 | Romanick ..................... 701/123 |
| 2008/0221787 A1* | | 9/2008 | Vavrus ............... G01C 21/3469 701/423 |
| 2008/0270016 A1* | | 10/2008 | Proietty et al. ............... 701/123 |
| 2008/0287141 A1* | | 11/2008 | Vogel et al. ................ 455/456.3 |
| 2008/0294339 A1* | | 11/2008 | Tauchi ............... G01C 21/3469 701/455 |
| 2008/0309508 A1 | | 12/2008 | Harmon |
| 2009/0210142 A1* | | 8/2009 | Couckuyt .......... G01C 21/3484 701/532 |
| 2010/0010732 A1* | | 1/2010 | Hartman ...................... 701/200 |
| 2010/0036599 A1* | | 2/2010 | Froeberg et al. ............. 701/200 |
| 2010/0036606 A1* | | 2/2010 | Jones ................. G01C 21/3446 701/533 |
| 2010/0049397 A1* | | 2/2010 | Liu et al. ......................... 701/33 |
| 2010/0076675 A1* | | 3/2010 | Barth et al. .................. 701/200 |
| 2010/0106603 A1* | | 4/2010 | Dey ................... G01C 21/3484 705/14.63 |
| 2010/0145569 A1* | | 6/2010 | Bourque ............ G01C 21/3469 701/31.4 |
| 2010/0153001 A1* | | 6/2010 | Bauchot et al. ............. 701/201 |
| 2010/0292921 A1* | | 11/2010 | Zachariah ............... G06Q 50/30 701/533 |
| 2010/0324817 A1* | | 12/2010 | Hansen et al. ................ 701/210 |
| 2011/0106370 A1* | | 5/2011 | Duddle ................. G06Q 40/08 701/31.4 |
| 2011/0301832 A1* | | 12/2011 | Zheng et al. ................. 701/200 |
| 2012/0059578 A1* | | 3/2012 | Venkatraman ................ 701/411 |

FOREIGN PATENT DOCUMENTS

| | | |
|---|---|---|
| EP | 1 918 895 | 5/2008 |
| FR | 2 906 608 | 4/2008 |
| JP | H02278116 A | 11/1990 |
| JP | H10197272 A | 7/1998 |
| JP | 2005077299 A | 3/2005 |
| JP | 2005195451 A | 7/2005 |
| JP | 2005537497 A | 12/2005 |
| JP | 2006300780 A | 11/2006 |
| JP | 2007163379 A | 6/2007 |
| JP | 2008045992 A | 2/2008 |
| JP | 2008090829 A | 4/2008 |
| JP | 2008097345 A | 4/2008 |
| JP | 2008107155 A | 5/2008 |
| JP | 2008292302 A | 12/2008 |
| JP | 2008249536 A | 10/2014 |
| RU | 2328702 C2 | 7/2008 |
| RU | 2333537 C1 | 9/2008 |
| WO | 2004021305 A2 | 3/2004 |
| WO | 2007125920 A1 | 11/2007 |

OTHER PUBLICATIONS

International Preliminary Report on Patentability and Written Opinion of the International Search Authority, dated Jun. 29, 2011.
PCT/US2008/013956, ISR (International Search Report) dated Sep. 17, 2009.

* cited by examiner

METHODS, DEVICES AND MAP DATABASES FOR GREEN ROUTING

This application is the National Stage of International Application No. PCT/US2008/013956, filed Dec. 22, 2008 and designating the United States. The entire contents of this application is incorporated herein by reference.

FIELD

Embodiments of the present disclosure generally relate to methods, devices and map databases for determining a route of travel from a first location to a second location having a relatively lower cost, and more particularly for determining such a route of travel having a relatively lower environmental and/or vehicular operation cost where such costs are determined based, at least in part, on acceleration data collected from probe vehicles. Illustrative embodiments relate to portable navigation devices ("PNDs"), in particular PNDs that include Global Navigation Satellite System (GNSS), and more particularly Global Positioning Satellite system (GPS), signal reception and processing functionality. Other embodiments relate, more generally, to any type of processing device that is configured to execute navigation software so as to provide route planning, or routing optimization, and preferably also navigation, functionality.

BACKGROUND

This section provides background information related to the present disclosure which is not necessarily prior art.

In recent years, consumers have been provided with a variety of devices and systems to enable them to locate places on a digital map. The term "place" is a general term used throughout the description of embodiments of this invention. The term "place" includes street addresses, buildings located at street addresses such as businesses and landmarks, and facilities located at a number of street addresses such as shopping malls and business parks. The variety of devices and systems used by consumers are in the form of in-vehicle navigation systems that enable drivers to navigate over streets and roads; hand-held devices such as personal digital assistants ("PDAs"), PNDs, and cell phones or other types of mobile devices that can do the same; desktop applications, and Internet applications in which users can generate maps showing desired places. The common aspect in all of these and other types of devices and systems is a map database of geographic features, vectors and attributes, and software to access, manipulate and process the map database in response to user queries.

Essentially, in all of these devices and systems a user can enter a desired place and the returned result will be the location of that place. Typically, users will enter the name of a business, such as a restaurant for example, or a destination landmark, such as the Golden Gate Bridge for example, or a street address, etc. The device/system then determines and returns the location of the requested place. The location may be shown on a map display, or may be used to calculate and display routes and present driving directions to the location in a known manner, or used in other ways.

When driving directions, or a route of travel, from a first location to a second location, is determined, the route of travel is typically determined according to an algorithm. The first location is often the user's current location, either input by the user or determined by the device/system, such as from received Global Navigation Satellite System (GNSS) signals, while the second location is an input location (or destination). Various such algorithms are known to those skilled in the art. These algorithms generally share several features. An obvious primary feature of all such algorithms is actually determining a route of travel from the first location to the second location. Generally, these algorithms also determine such a route of travel to achieve various preprogrammed and/or user selected goals. These goals can include, for example, the shortest travel time, the shortest distance, or the most scenic route of travel.

SUMMARY

This section provides a general summary of the disclosure, and is not a comprehensive disclosure of its full scope or all of its features.

At least one embodiment of the present application is directed to a method performed by a processor including algorithmically determining a plurality of vehicle cost values for traveling a plurality of road segments in a vehicle based, at least in part, on vehicle cost data derived at least in part from position derivative data obtained from at least one vehicle that traveled the road segments. The method further includes associating each of the plurality of road segments with at least one of the vehicle cost values and storing the determined vehicle cost values in a memory device.

Another embodiment of the present application is directed to a map database, storable on a storage medium. The map database includes map information about a plurality of road segments. At least one vehicle cost value is associated with each of the plurality of road segments, the vehicle cost value being derived at least in part from position derivative data obtained from at least one vehicle that traveled the road segments At least one other embodiment of the present application is directed to an automated method for determining a route of travel from a first location to a second location. The method includes determining algorithmically, from a map database including a plurality of road segments and at least one vehicle cost value associated with each of the plurality of road segments, a route of travel from the first location to the second location along at least one of the plurality of road segments. The at least one vehicle cost value is derived at least in part from position derivative data for the plurality of road segments. The determination of the route of travel is based at least in part on the associated at least one vehicle cost value, to relatively reduce a total cost to travel the route of travel.

Another embodiment of the present application is directed to a device including a memory to store a map database. The map database includes map information including a plurality of road segments and a plurality of vehicle cost values. At least one vehicle cost value being associated with each of the plurality of road segments. The vehicle cost values are derived from position derivative data obtained from at least one vehicle that traveled the road segments. The device includes a processor to determine a route of travel using the map database. The determined route of travel includes at least one of the road segments and the determination being based, at least in part, on the associated vehicle cost values. The determination relatively reducing a total cost to travel the route of travel in a vehicle. The device includes an output device, controllable by the processor, to output the determined route of travel.

Finally, at least one other embodiment of the present application is directed to a device for use in a vehicle. The device includes a GNSS receiver for receiving GNSS signals. The device includes a memory to store a map database including map information including a plurality of road segments and a plurality of vehicle cost values. The vehicle cost values are derived from position derivative data obtained from at least one vehicle that traveled the road segments and each of the plurality of road segments being associated with at least one vehicle cost value. The device includes a processor, communicatively coupled to the GNSS receiver and the memory, to determine a location of the device, at least in part, from the GNSS signals, to associate the location of the device with at least one of the plurality of road segments, to retrieve the at least one vehicle cost value associated with the at least one of the plurality of road segments on which the vehicle is located and to determine a manner of vehicle operation to relatively reduce a total cost to operate the vehicle along at least one of the plurality of road segments.

Advantages of these embodiments are set out hereafter, and further details and features of each of these embodiments are defined in the accompanying dependent claims and elsewhere in the following detailed description. Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Various aspects of the teachings of embodiments of the present invention, and arrangements embodying those teachings, will hereafter be described by way of illustrative example with reference to the accompanying drawings, in which.

DETAILED DESCRIPTION OF EXAMPLE EMBODIMENTS

Figure 1:
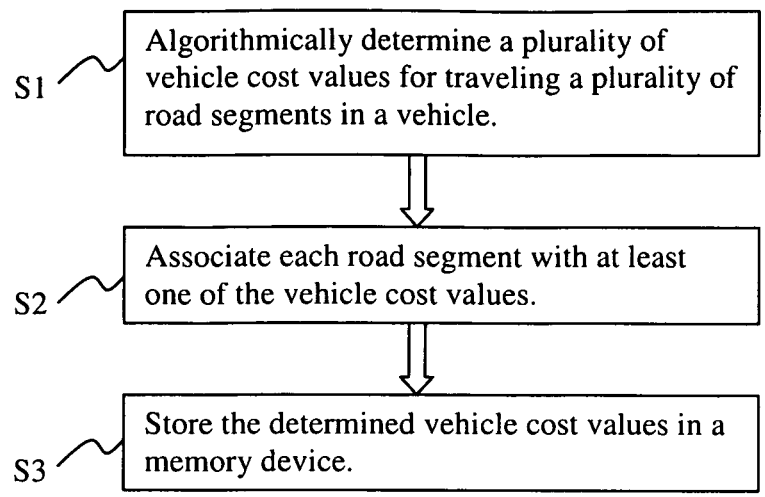
FIG. 1 illustrates an example embodiment of a method of the present application.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Digital map databases are known to include address segment vectors or road segments having starting and ending points, street names and other types of attributes, and address ranges representing assigned addresses on that segment. Such digital map databases (map databases) are used in geocoding, GIS and navigation techniques, for example, when locating a place, such as a desired travel destination (for example, selected or input through an integrated input and display device of a navigation device). Digital map databases (for example, digital map databases that are commonly maintained by vendors of digital map databases and referred herein as digital map source databases) can be stored in a central server (and can be accessed directly for geocoding applications for example), and reduced versions thereof (referenced herein as digital map application databases) can be downloaded or otherwise transferred to memories of devices including but not limited to geocoding devices, in-vehicle navigation devices, personal navigation devices and/or any other devices with navigation capabilities including but not limited to cell phones, PDAs, etc. and/or can be stored in a memory or stored on any type of digital media. Techniques for forming such digital map application databases from digital map source databases and/or copying portions of digital map source databases to form the digital map application databases are known to those of ordinary skill in the art and will not be discussed herein for the sake of brevity.

Such digital map application databases are typically downloadable to a personal navigation device, or other suitable devices including capabilities such as geocoding, navigation, routing and directions, map display, mapping, integration of traffic or other realtime dynamic data and/or location based services, by the device accessing and downloading or copying new digital map application databases from the server, periodically via the internet or a mobile network connection for example (such as every few months when new information is received for example), or for in-vehicle navigation devices, by a new updated digital map application database being stored on a CD-Rom for example, wherein the CD-Rom then can be input into the in-vehicle navigation device of the vehicle to update the digital map application database stored in the memory of the in-vehicle navigation device. Such updating techniques are not limited to those discussed above and can include any technique for updating (completely or incrementally) digital map application databases, and are known to those of ordinary skill in the art and will not be discussed herein for the sake of brevity.

When a user operates a vehicle to travel from a first location to a second location, whether navigating using a navigation device or navigating from memory (sometimes referred to as "free driving"), there are various costs associated with operating the vehicle. The primary traditional costs associated with traveling from a first location to a second location include time and distance. Thus, for example, it costs a person one hour of time or 50 miles of distance to travel from a first location to a second location.

In addition to the traditional costs, however, there are other costs associated with travelling from a first location to a second location, which will collectively be referred to herein as vehicle operation costs. For example, an operating vehicle consumes energy. In an automobile, this energy is generally provided by gasoline. In some vehicles, other energy sources are used such as, for example, diesel fuel, ethanol, biodiesel, solar power, batteries, etc. Regardless of the energy source, operating the vehicle incurs an energy cost as the energy stored in the source is converted to another form to operate the vehicle. One such energy cost is incurred accelerating the vehicle to operating speeds. An additional cost, which may be termed an "environmental cost", is caused by the emission of various chemicals, compounds, particulates, etc., such as, for example, carbon dioxide ($CO_2$), nitrogen oxides ($NO_X$), and sulfur oxides ($SO_X$), when many, if not all, vehicles are operated (some of these may be emitted elsewhere in the fuel production process). At least some of the various vehicle emissions are considered environmental pollutants and/or generally undesirable. Operating a vehicle also imposes a cost in a depreciation in the value of the vehicle (i.e. "wear and tear"). The operation of the vehicle exposes components to use in general, various stresses, strains, vibrations, extreme temperatures, etc., all of which may contribute to a decrease in the value, reliability and/or functionality of a vehicle. Such energy costs, environmental costs and wear and tear costs may be herein collectively referred to as "vehicle operation costs", "cost of operating a vehicle" and/or "vehicle costs".

Reducing and/or minimizing the costs of operating a vehicle between a first and second location may have many benefits. For example, such a reduction in the vehicle costs will reduce the financial cost of such an operation of the vehicle, by, for example, reducing the amount of fuel that must be purchased to operate a vehicle and/or slowing the depreciation in the value of a vehicle. Reducing the vehicle costs may also be beneficial in improving the environment and, more particularly, air quality directly, by reducing the overall emission of pollutants by a vehicle and indirectly, by reducing the amount of fuel that must be produced, and reducing the number of vehicles that must be produced and/or disposed of be extending the usable life of a vehicle.

According to various embodiments of the present disclosure, vehicle cost data can be gathered according to numerous different methods. Vehicle cost data includes data that impacts, suggests, represents, correlates with, is a surrogate for, or otherwise relates to vehicle operation costs. The methods of collecting such vehicle cost data may include gathering acceleration data from one or more probe vehicles, via a positioning system, via sensors mounted to the probe vehicles, via an on board diagnostic (OBD) connection to the probe vehicles, or other connection to a vehicle data system. The methods may also include collecting actual energy and/or fuel consumption of probe vehicles, again via sensors or an OBD connection, or other suitable source. According to some embodiments, the vehicle cost data may be derived from elevation data for a road segment. Vehicle cost data may also be derived from statistical data regarding road segments. Other data, including data regarding probe vehicles themselves (e.g., weight, make, model, type of engine, type and grade of fuel), probe vehicle operator identification information, time of day, road conditions and/or weather conditions during which data was collected, etc. may also be collected and associated with the vehicle cost data. These various ways to collect vehicle cost data will be discussed in further detail below.

In some embodiments, and as mentioned above, vehicle cost data may be acquired by collecting position derivative data for a plurality of probe vehicles operated along various road segments, and then inferring the cost based on the position derivative data (which consumes energy, fuel with the resulting emissions) based on a general or specific vehicle model. Position derivative data include, at least, the first, second and third derivatives of position (velocity, acceleration and jerk, respectively). The position derivative data may be acquired from GNSS data (such as from a navigation device), sensors installed on the vehicle, directly from the vehicle via a connection to the OBD connector, or any other suitable means or combination thereof. Each of the various derivatives may be determined directly or may be derived from another of the position derivative data. Location information for each of the probe vehicles (provided by, for example, a GNSS device) is collected generally simultaneously and associated with the position derivative data. Thus, the locations along various road segments can be correlated with position derivative data from the probe vehicles. Such position derivative data may provide a relatively good representation of the relative costs associated with operation of a vehicle along a road segment. For example, resistance increases as the cube of velocity, thereby increasing fuel consumption and emissions. Similarly, wear and tear on a vehicle, fuel consumption and emissions from a vehicle generally increase with acceleration and jerk. The position derivative data can include average values, maximum values, minimum values, median values, mode values, and other values, collected from the probe vehicles and calculated according to known statistical methods for calculating such values. In some instances different of these values may be relatively more important for determining vehicle cost data. For, example, maximum acceleration along a road segment may impact vehicle emissions more than the average acceleration along the same road segment.

Actual fuel consumption may also be collected from probe vehicles for each road segment. The fuel consumption data may be collected from sensors installed in the probe vehicles, directly from the car via an OBD connection, or other suitable means. As with the acceleration data, the fuel consumption data is correlated to location data in order to determine fuel consumption along each of the road segments. Fuel consumption data is, obviously, a good representative of energy consumption costs for each road segment. Additionally, fuel consumption of a vehicle may generally be used to approximate other vehicle costs, such as emissions and wear and tear, especially if the specific vehicle type is known.

Elevation data for particular road segments may also be acquired for use as vehicle cost data. Elevation data is widely available for most locations and may be associated with road segments according to known methods. Elevation data is useful as vehicle cost data for multiple reasons. The average elevation of a road segment above sea level may affect vehicle emissions and fuel consumption, due to the vehicle operating more efficiently at some elevations than at others. Additionally, changes in elevation can be correlated to increased or decreased costs. When elevation is increasing along a direction of travel of a road segment, for example, a vehicle will typically need to work harder than the same vehicle on a level road segment. This extra work tends to result in more fuel consumption, higher emissions, and possibly, greater wear and tear on the vehicle. Conversely, when elevation is decreasing along a direction of travel of a road segment, a vehicle will typically need to perform less work than the same vehicle on a level road segment. With some vehicles, such as hybrid or electric vehicles, usable energy may actually be generated or captured when traveling from a higher to a lower elevation, thereby decreasing the overall fuel consumption of the vehicle. This ability to recapture energy will be vehicle specific, and can be modeled for that vehicle.

As mentioned above, vehicle cost data may also be derived from statistical data regarding road segments. As suggested by the name, such statistical data represents the probability of incurring some cost along a road segment. The possible costs are often related to the costs and data discussed above and may be collected in similar ways and/or from existing historical data and analysis. For example, if a road segment includes traffic lights, there is only a chance that a vehicle will need to stop for a red light and accelerate (thereby consuming energy, emitting pollutants, etc.) again when the light turns green. Sometimes the light will be green and a vehicle may continue along the road segment at a constant speed, i.e. with zero acceleration. When enough data is available, a reasonably accurate probability of encountering a red light along a road segment can be calculated and used as statistical vehicle cost data. For example, it may be determined that there is a fifty percent chance of encountering one red light along a certain road segment and, when correlated with other vehicle cost data, that such an encounter will increase fuel consumption by a vehicle by two ounces over the road segment. Thus, the vehicle cost data may associate an additional one ounce of fuel with the road segment. Alternatively, the vehicle cost data may include the statistical data in a raw form (e.g. a fifty percent chance of an additional two ounces of fuel) so that the data may be used in various other ways. Other events and/or occurrences may be included in the statistical cost data. For example, the statistical cost data may include the probability of encountering an emergency vehicle, encountering a school bus, encountering a traffic accident, encountering certain levels of traffic congestion, encountering inclement weather, etc.

Other vehicle cost data, representing energy consumption, work, power, or some combination or component thereof, may also be obtained from a plurality of probe vehicles that have traveled along road segments. This data may be inferred from the motions of the vehicle in combination with suitable vehicle models, or may be acquired from the vehicles via connection to the vehicles' OBD or from sensors mounted on the vehicles. Such sensors can include, power sensors, torque sensors, level sensors, elevation sensors, accelerometers, wind sensors, motion sensors, etc. The data collected in this manner may be used and/or analyzed similar to other data discussed above.

Still other vehicle cost data relating to generally constant conditions of a road segment may be acquired. Such generally constant conditions may include the repair condition of the road (e.g. rutted, potholes etc.), the material from which the road is constructed (e.g. dirt, gravel, clay, paved, etc.), frictional coefficients of the road surface, road surface or any other generally constant conditions. Some conditions which may not be constant on some road segments may be constant road conditions for other road segments. For example, a road segment very close to a shore break, waterfall or other water source may be constantly wet, although for most roads the presence of water on the road would be variable. Similarly in areas of extreme cold, e.g. polar regions, some road segments may always have ice or snow on them, or always have road surface temperatures below some temperature. All such generally constant conditions may influence the cost of operating a vehicle on such road segments and vehicle cost data may be collected and used in accordance with embodiments of this disclosure.

Although the various types and methods of collecting vehicle cost data are individually discussed above, it should be noted that these may be used together or separately. Thus, vehicle cost may include one or more of the types of data collected above and such data may have been collected according to one or more of the methods of acquiring the data discussed above. Additionally, vehicle cost data discussed above may be acquired by other suitable device/method and/or the methods/devices of acquiring vehicle cost data discussed above may be applied to collecting different vehicle cost data.

FIG. 1 illustrates one aspect of the present disclosure. A method performed by a processor including, at S1, algorithmically determining a plurality of vehicle cost values for traveling a plurality of road segments in a vehicle based, at least in part, on vehicle cost data. At S2, the method further includes associating each of the plurality of road segments with at least one of the vehicle cost values and, at S3, storing the determined vehicle cost values in a memory device.

After vehicle cost data is acquired, a plurality of vehicle cost values for traveling a plurality of road segments in a vehicle are algorithmically determined. For clarity and simplicity, and without limiting the scope of this disclosure, this determination of vehicle cost values generally will be discussed with reference to an example of vehicle cost data that is acceleration data collected from a plurality of probe vehicles that have traveled a plurality of road segments. Additionally, although the discussion will be limited to determination for a single road segment, the method may simply be repeated for each of a plurality of road segments. The vehicle cost values derived from the vehicle cost data may represent numerous, varied expected vehicle costs. For example, the vehicle cost data may represent an expected energy or fuel consumption of a vehicle, an expected pollutant emission of a vehicle, and expected depreciations of the value of the vehicle, and/or some combination thereof.

The vehicle cost data for a particular road segment may initially be analyzed and grouped according to various desired groupings. Anomalous data, extreme values, and/or outliers may be discarded according to known statistical analysis principles. Vehicle cost data may be grouped into, or assigned a sub-identifier based on, any desired subcategories/subidentifications, such as the type of vehicle (i.e. truck, car, compact car, delivery van, semi-truck, etc.), make of vehicle, weight of vehicle, time of day collected, or other identifying categories for which data is available. Hence the vehicle cost data may be used to create, for example cost/weight curves or values for the associated road segments. After such statistical analysis is performed, a vehicle cost value is then algorithmically calculated from the edited vehicle cost data.

The specific algorithm is variable and may be any suitable algorithm for determining a representative value of the cost of operating a vehicle along the road segment. For example, the vehicle cost value may simply be the acceleration multiplied by the weight or mass of the vehicle. Such calculations may be performed for the vehicle cost data in each subcategory individually and/or for all vehicle cost data for the road segment regardless of subcategory identification (if any). As another example, the algorithm may simply assign a relative, but otherwise meaningless, value as the vehicle cost value. For example the algorithm may assign a vehicle cost value of 0 to a road segment if the average acceleration along the segment is 0 m/s$^2$ and a value of 1 to a road segment if the average acceleration is between 1 and 5 m/s$^2$. Of course the vehicle cost value need not be a number. The algorithm may instead assign relative terms as the vehicle cost value, such as, for example, worst/average/best or poor/fair/good/excellent. If appropriate data is available, the algorithm may determine an actual vehicle cost value for a specific type of vehicle cost. For example, the algorithm may calculate the actual fuel consumption of 0.1 liters per kilometer of the road segment (about 10 km/liter or 23.5 miles/gallon) based on the vehicle cost data.

More than one vehicle cost value may be associated with each of the plurality of road segments. Such vehicle cost values may be calculated by different algorithms, using different data from, and/or represent different vehicle costs. Thus a vehicle cost values representing expected fuel economy, expected pollutant emissions and/or expected depreciation may each be calculated for each of some or all road segments and stored in memory. Alternatively, or additionally, a single vehicle cost value that represents some combination of these vehicle cost values may be determined by the algorithm. The algorithm may be adjusted to obtain a desired goal or balance of more than one of the vehicle costs. Thus, for, example the vehicle cost value may be desired to primarily reflect expected fuel economy, place little weight on expected pollutant emissions and ignore expected depreciation. In such a situation, the algorithm may determine a vehicle cost value by heavily weighting for fuel economy including a slight adjustment to reflect expected pollutant emissions and ignoring all vehicle cost data related primarily to expected depreciation. More than one vehicle cost value may be associated with a road segment even for the same type of expected cost or combination when subcategories of vehicle cost data, as discussed above, are devised. Thus, for a road segment there may be a vehicle cost value representing expected fuel economy for a compact car, another vehicle cost value representing expected fuel economy for a truck, another vehicle cost value representing expected fuel economy for a semi-truck, hybrid vehicle, electric vehicle, or diesel truck, etc. These subcategorized vehicle cost values may be combined with other vehicle cost values in the manners discussed above.

It should also be noted that techniques other than the documented algorithms may be possible for determining vehicle cost values from vehicle cost data. Thus, the embodiments of the present application should not be limited by the algorithms expressed above. The application should only be limited by the claims set forth therein.

Some embodiments of the present application are directed to a map database, storable on a storage medium. The map database includes map information about a plurality of road segments. At least one vehicle cost value is associated with each of the plurality of road segments, the vehicle cost value being derived at least in part from acceleration data obtained from a plurality of probe vehicles that traveled the road segments.

Thus, according to some embodiments of the present disclosure, vehicle cost values derived from vehicle cost data, as discussed above, are included in a map database. The map database may be a digital map database or a digital map application database. The vehicle cost values may be stored as part of the map data contained in the map database or may be stored separately from the map data. Wherever stored, each road segment of a plurality of road segments is associated with at least one of the vehicle cost values. The general manner of creating map databases and associating data with road segments is known to those skilled in the art and will not be further discussed herein.

A map database created according to embodiments discussed above has numerous possible uses. Embodiments using/and or including vehicle cost values and map databases according to the present disclosure will be discussed below.

At least one embodiment of the present disclosure is directed to an automated method for determining a route of travel from a first location to a second location. The method includes determining algorithmically, from a map database including a plurality of road segments and at least one vehicle cost value associated with each of the plurality of road segments, a route of travel from the first location to the second location along at least one of the plurality of road segments. The determination of the route of travel is based at least in part on the associated at least one vehicle cost value, to relatively reduce a total cost to travel the route of travel an automated method for determining a route of travel from a first location to a second location.

Thus a route of travel from a first location to a second location is calculated based, at least in part, on minimizing, or at least reducing, the cost required to travel from the first location to the second location. Thus, the determined route of travel may have a lower expected energy consumption, lower expected pollutant emission and/or lower expected depreciation of the value of the vehicle than other possible routes of travel. Because of this ability to attempt to reduce fuel use and pollutant emissions, such a method of determining a route of travel may be referred to at times as "green routing".

The route of travel is determined based, at least partly, on the vehicle cost values associated with road segments. As with known methods of route calculation based on road segment speeds, road segment distances or some combination of the two, a route determination algorithm according to the present disclosure seeks to minimize some value or combination of values. Unlike known methods which seek to minimize traditional costs (i.e. time and distance), the values to be minimized in embodiments of this disclosure include vehicle operating costs as discussed above. The primary requirement of the determined route of travel is that it actually determined a route of travel from a first location to a second location. However, between any two reasonably distant locations, there are a very large number of possible routes of travel. An algorithm according to this disclosure determines a route of travel based on attempting to minimize the cost associated with traveling the route of travel in a vehicle. The route may be determined solely (except for consideration of finding an actual route of travel between the two locations) on this basis or only partly on this basis. For example the algorithm may base the route on minimizing the total cost (a sum of the vehicle cost values of the road segments in the route of travel). In such an algorithm the total cost may be minimized without regard to time or distance traveled. At times, such an algorithm may result in very complex, tedious, and/or time consuming routes of travel being determined. Alternatively, the route may be calculated based on some combination of the vehicle cost values and some other values. The route of travel may be based also on a desire to minimize the time consumed by traveling a route of travel. The algorithm may, for example, determine the route with the least cost so long as the time to travel the route does not exceed the fastest possible route by some amount of time or percentage of the total travel time. If the route of travel will exceed the amount of time, the algorithm may adjust (or recalculate) the route to achieve a route of travel still having a relatively lower cost, but for which the time to travel does not exceed the aforementioned amount of time. Alternatively, such a determination may be performed at the road segment level (rather than the complete route of travel). Further alternatively, and similar to the algorithm discussed above with respect to time, the algorithm may determine the route of travel with a relatively lower cost so long as the distance traveled on the route does not exceed the shortest possible route by some distance or percentage of the distance. As can be seen the specifics of the algorithm may be widely varied to suit various situations without departing from the scope of this disclosure.

In determining the route of travel having a relatively lower cost, additional data may be used in the algorithm to further enhance the accuracy of the cost of traveling the route. This additional data may include data about the vehicle to travel the route and/or temporary data. Information about the vehicle which is to travel the route may include as the type of vehicle (i.e. truck, car, compact car, delivery van, semi-truck, etc.), type of engine (gasoline, diesel, electric, hybrid, solar, etc.), make of vehicle, weight of vehicle, drag coefficient of the vehicle, type and grade of fuel, etc. Such vehicle specific data may be provided by a user of the method disclosed herein, may be retrieved from the vehicle (such as via an OBD connection), or by any other suitable method. Temporary data can include weather data, traffic data, time of day, etc. Such information may be provided by a user, but is more likely retrieved automatically from another source. Methods for receiving such temporary data (such as from an RF broadcast, satellite based service, internet based service, atomic clock, etc.) are known to those skilled in the art and will not be further discussed.

Some example embodiments of this disclosure are directed to a device. In some such embodiments, the device is a navigation device, or more specifically a portable navigation device or in-vehicle navigation device. Such devices may include, among other things, device application software.

Device application software access and manipulate the derived digital map application database in response to user inputs. The software's output to the user can be in a list, text, graphical display such as a map or video, audio such as speech, or other type of output. Many GIS, Internet and Navigation applications can use embodiments of the present invention discussed above. These applications include geocoding applications (text/list based), routing/directions applications (graphical/list/speech based) and graphical-based display applications. The applications can include navigation, Internet-based and Geographical Information Systems (GIS) among others. The application can be a mapping program, a navigation program or some other type of program. As discussed above, map application consumers have been provided with a variety of devices and systems to enable them to locate desired places. These devices and systems are in the form of in-vehicle navigation systems which enable a driver to navigate over streets and roads and to enter desired places, hand-held devices such as personal digital assistants ("PDAs") and cell phones that can do the same, and Internet applications in which users can access maps using or depicting the desired results. For purposes of this disclosure all such results are simply defined as "places."

Figure 2:
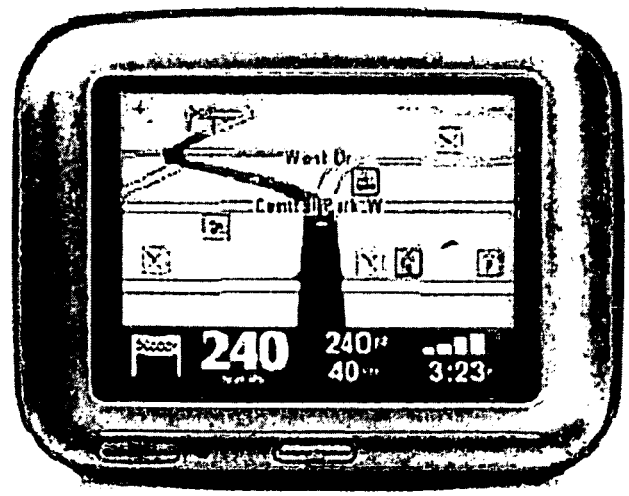
FIG. 2 illustrates an example embodiment as used on a hand-held device, such as personal navigation device (PND)

FIG. 2 illustrates an example embodiment as used on a portable hand-held device, such as personal digital assistant (PDA). The device could also be a cell phone, for example. On PDA map software, an example search may be performed by a user who wants driving directions to 150 Central Park West. The PDA map software utilizes embodiments of the present invention to accurately display the location of 150 Central Park West using the PDA map software.

Figure 3:
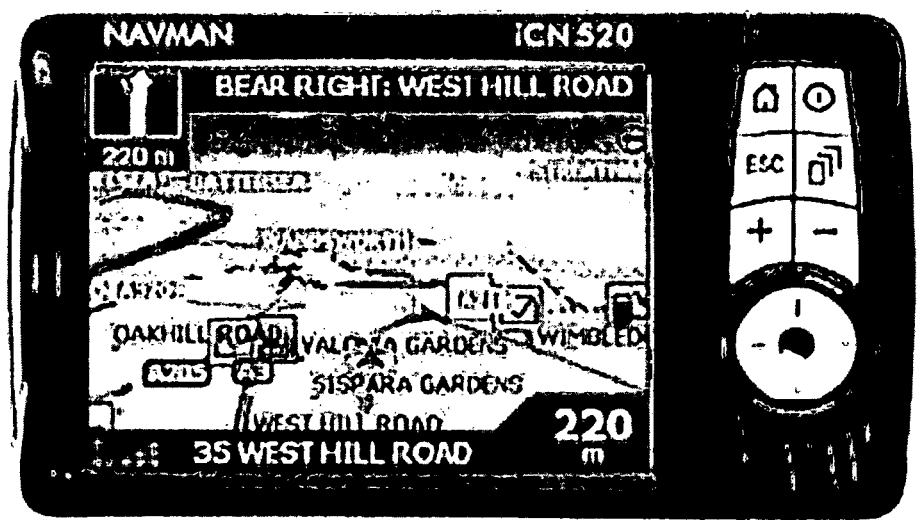
FIG. 3 illustrates an example embodiment as used on an in-vehicle navigation system, such as one integrated with a global positioning system (GPS)

FIG. 3 illustrates an example embodiment of the method, database, memory, etc. as used on an in-vehicle navigation system, such as a global navigation satellite system GNSS (e.g., global positioning system (GPS)). On GPS map software, an example search may be performed by a driver who wants driving directions to 35 West Hill Road, as shown at the bottom of the GPS map software. The GPS map software utilizes embodiments of the present invention to accurately display the location of 35 West Hill Road, once the driver reaches his or her destination using the GPS software.

Figure 4:
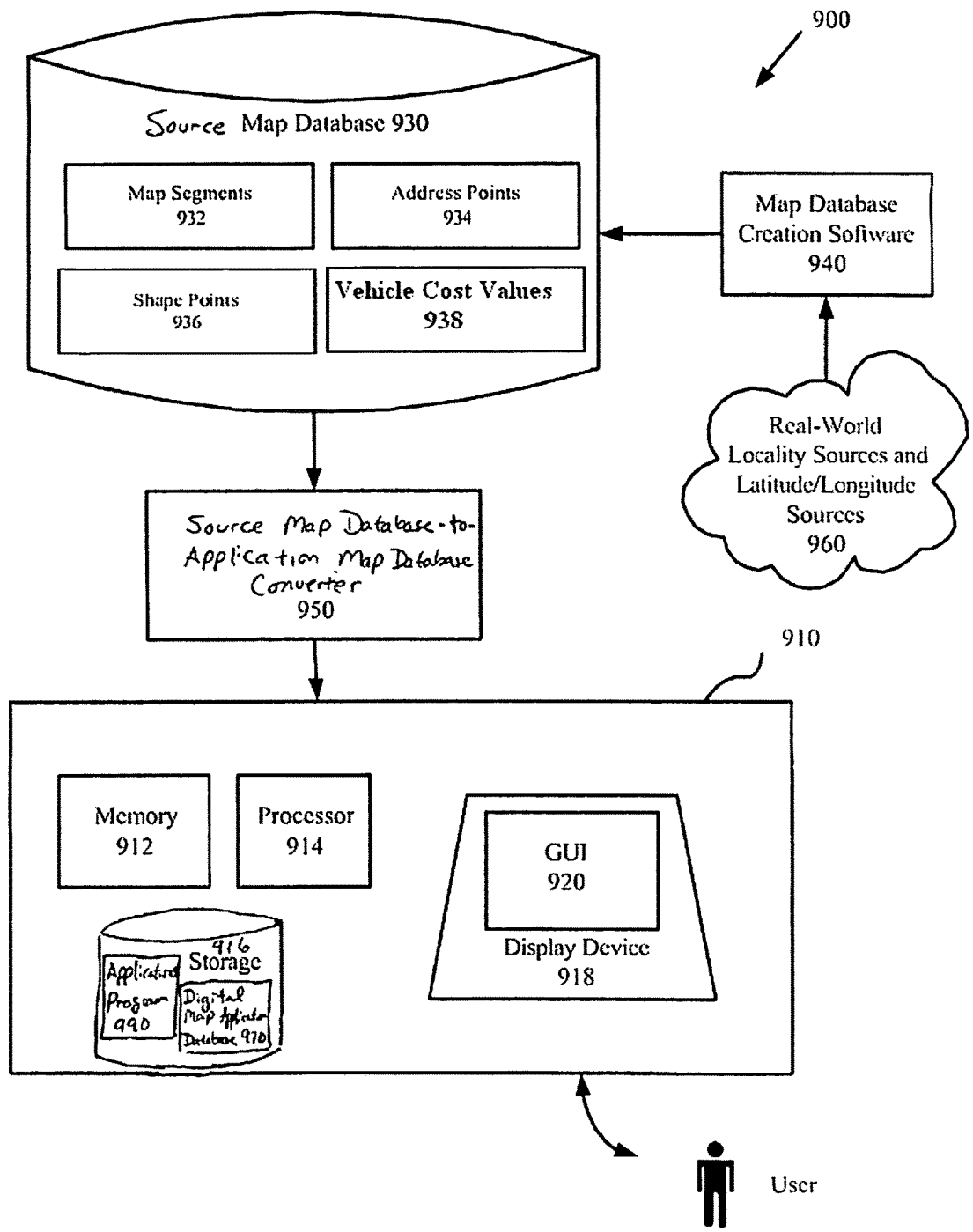
FIG. 4 illustrates embodiments of system that can be used with embodiments of the present disclosure.

FIG. 4 shows a block diagram of an example system 900 that can be used with embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device/system or can be distributed among different computing devices/systems connected by one or more networks or other suitable communication means.

As shown in FIG. 4, the system 900 typically includes a computing device 910 which may comprise one or more memories 912, one or more processors 914, and one or more storage devices or repositories 916 of some sort, at least one of the devices 916 including a digital map application database 970. The computing device 910 may further include a display device 918, including a graphical user interface or GUI 920 operating thereon by which the system can display maps and other information to a user. The user uses the computing device to request, for example, that a locality be displayed on a map or that driving directions be displayed as a route on a map and/or as text directions. The system may comprise an Internet-based system and/or an in-vehicle navigation system, for example.

A source map database 930 is shown as external storage to computing device or system 910, but the source map database 930 in some instances may be the same storage as storage 916. According to embodiments of the present invention, source map database 930 contains a map, or road, segments table and index 932, an address points table and index 934, a shape points table and index 936, and a vehicle cost value table and index 938.

Proprietary map database creation software 940 will use real-world locality sources and latitude/longitude sources 960 to create the map segments, address points and shape points tables and indices 932, 934 and 936, respectively, in the source map database 930. Information from the source map database 930 is used by a source map database-to-application map database converter 950, which is ultimately used by a user of the computing device 910. The source map database-to-application map database converter 950 is shown remote to the user's computing device 910. This conversion may be the result of the map vendor as well as the result of the application software provider. The resulting digital application map database 970 is typically stored in device storage unit 916. This device application software 990 is also shown in computing device 910 stored in storage device unit 916, but may be resident in memory 912 or even stored remotely.

At least one embodiment of the present disclosure is directed to a device 200 including a memory 230 to store a map database. The map database includes map information including a plurality of road segments and a plurality of vehicle cost values. At least one vehicle cost value being associated with each of the plurality of road segments. The device 200 includes a processor 210 to determine a route of travel using the map database. The determined route of travel includes at least one of the road segments and the determination being based, at least in part, on the associated vehicle cost values. The determination relatively reducing a total cost to travel the route of travel in a vehicle. The device 200 includes an output device 260, controllable by the processor 210, to output the determined route of travel.

In such embodiment, the map database may be created and may include vehicle cost values derived from acceleration data from a plurality of probe vehicles that have traveled the plurality of road segments in the manner discussed above. The device may also include a GNSS receiver. The GNSS receiver receives GNSS signals and the processor is configured to determine a location of the device from such signals.

At least one other embodiment is directed to a device 200 for use in a vehicle. The device includes a GNSS receiver 250 for receiving GNSS signals. The device 200 includes a memory 230 to store a map database including map information including a plurality of road segments and a plurality of vehicle cost values, each of the plurality of road segments being associated with at least one vehicle cost value. The device 200 includes a processor 210, communicatively coupled to the GNSS receiver 250 and the memory 230, to determine a location of the device from the GNSS signals, to associate the location of the device with at least one of the plurality of road segments, to retrieve the at least one vehicle cost value associated with the at least one of the plurality of road segments on which the vehicle is located and to determine a manner of vehicle operation to relatively reduce a total cost to operate the vehicle along at least one of the plurality of road segments.

In such an example embodiment, the device 200 is useful for determining a relatively reduced cost method of operating a vehicle along a road segment. In some embodiments, the device 200 includes an output device 260. The output device 260, which may be audio, visual or some combination and is controlled by the processor 210, can output the manner of vehicle operation to a user of the device 200. Thus, the device 200 can communicate to the user how to operate the vehicle, e.g., reduce speed/acceleration, increase speed/acceleration, maintain certain speed/acceleration, etc. to reduce the vehicle costs.

Further, in some embodiments the device 200 may further include an interface for coupling the device with the vehicle. The processor 210 is configured to control at least one operation parameter of the vehicle to assist the vehicle to operate in the manner of vehicle operation. Thus, the device 200 may additionally, or alternatively, control the vehicle, at least to a limited extent, to attempt to operate in the determined manner of vehicle operation to reduce the cost. The device 200 may affect any parameters for which it may be configured to control. For example, the device 200 may limit the maximum acceleration of the vehicle, cause the vehicle to maintain a constant speed, change operational parameters of the engine, etc. With vehicles such as electric and hybrid vehicles, the device may control voltage applied to motors, duty cycle of pulses applied to motors, maximum torque values, etc.

In some embodiments, the device 200 may also be useful for post travel instruction of a user of the device. In such embodiments, the processor 210 is configured to store a starting point (first location), a destination (second location) and a route of travel that the device 200 (by being transported by the user) traveled from the first location to the second location. A total cost of the traveled route of travel is derived from the vehicle cost values of the road segments making up the route of travel and stored in memory. The processor may be configured to determine an alternative route of travel from the first location to the second location having a reduced total cost. The device 200 may then inform the user or another person of the alternative route of travel and the relative savings (i.e. the difference between the total cost of the actually traveled route and the reduced total cost of the alternative route). This communication may be communicated directly from the device 200, such as via audio or visual communication, or may be otherwise transmitted to the user, for example via email, text message, telephone message, etc.

Figure 5:
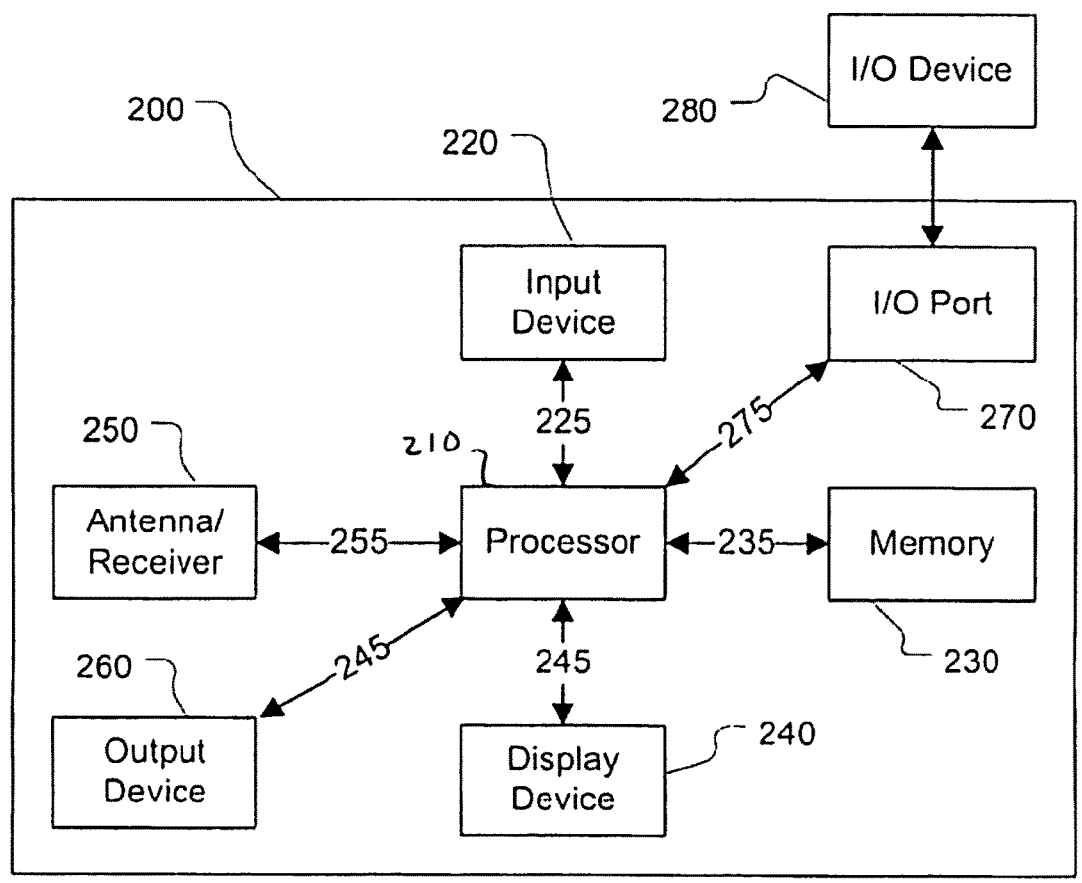
FIG. 5 illustrates electronic components arranged to provide a navigation device of an example embodiment of the present application.

FIG. 5 is an illustrative representation of electronic components of a navigation device 200 according to an example embodiment of the present invention (providing more detail than that of FIGS. 2 and 3, noting that an in-vehicle navigation device of FIG. 3 may include more memory than a portable navigation device of FIG. 2), in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include but is not limited to a keyboard device, voice input device, touch panel and/or any other known input device utilized to input information; and the display screen 240 can include any type of display screen such as an LCD display, for example. In a particular example arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device 200 may include an output device 260, for example an audible output device (e.g. a loudspeaker), a text output device, etc. As output device 260 can produce audible information for a user of the navigation device 200, it should equally be understood that input device 220 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 may store a digital map application database (or even, in at least one instance of one example embodiment wherein the navigation device 200 has enough memory storage capacity, a source database) as discussed in any of the embodiments of the present invention discussed above and comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 5 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 5 are powered by power sources (not shown) in a conventional manner. As will be understood by one of ordinary skill in the art, different configurations of the components shown in FIG. 5 are considered to be within the scope of the present application. For example, the components shown in FIG. 5 may be in communication with one another via wired and/or wireless connections and the like. Thus, the scope of the navigation device 200 of the present application includes a portable or handheld navigation device 200 and/or includes an in-vehicle navigation device.

In addition, the portable or handheld navigation device 200 of FIG. 5 can be connected or "docked" in a known manner to a vehicle such as a bicycle, a motorbike, a car or a boat for example. Such a navigation device 200 is then removable from the docked location for portable or handheld navigation use.

Figure 6:
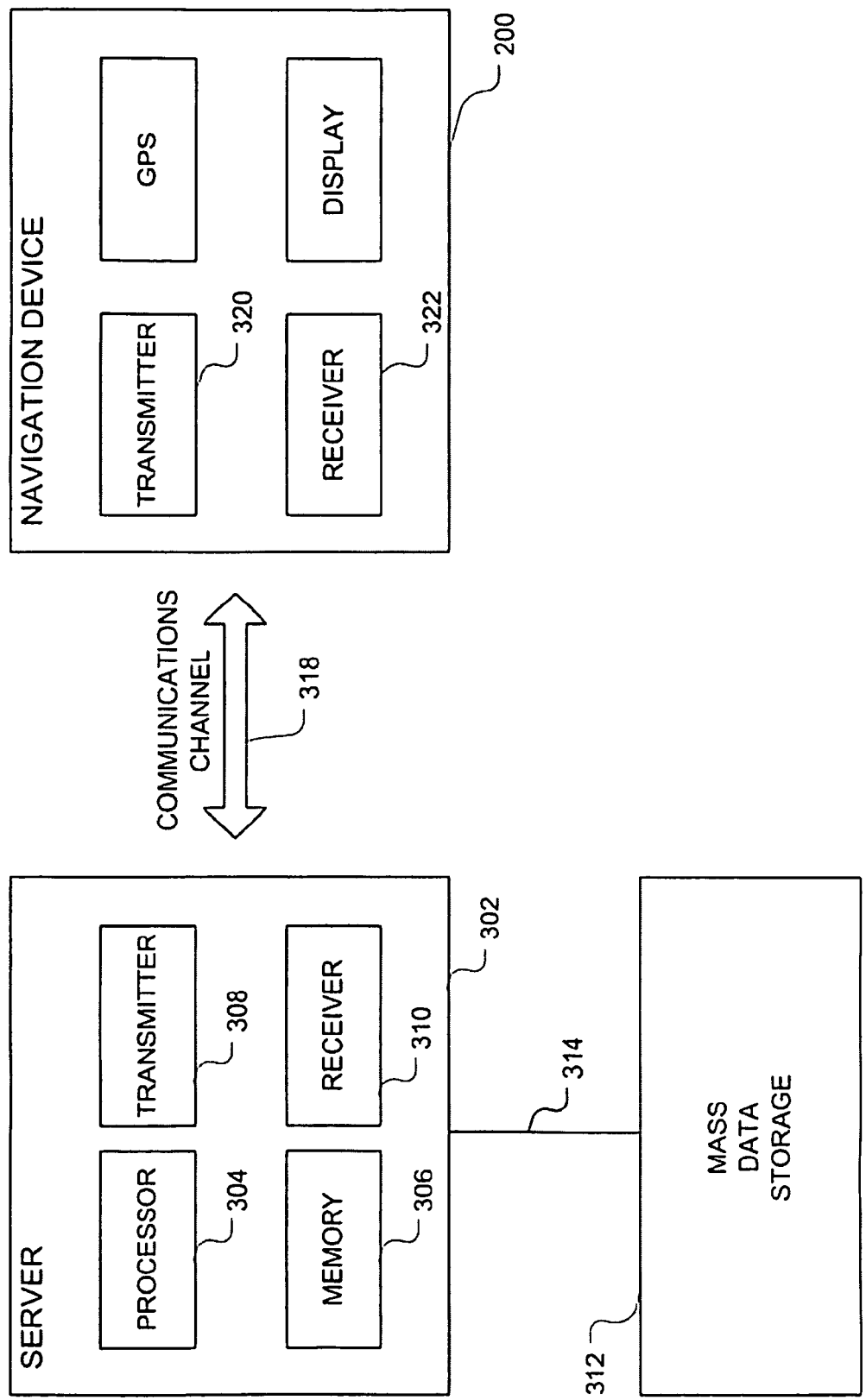
FIG. 6 illustrates an example embodiment where a navigation device may receive information over a wireless communication channel.

Referring now to FIG. 6, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection may be established between the navigation device 200 (which can be, and often times is mobile as it travels alone and/or in a vehicle) and the server 302 to provide a "real-time" or at least very "up to date" gateway for information. As such, the navigation device 200 can receive and later store in memory 230, a newly created digital map created by the embodiments of the method described above.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc. As such, the navigation device 200 can receive and later store in memory 230, a newly created digital map database including address sub-segment vectors, created by the embodiments of the method described above.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example. As such, the navigation device 200 can receive and later store in memory 230, a newly created digital map database including address sub-segment vectors, created by the embodiments of the method described above.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device. As such, the navigation device 200 can receive and later store in memory 230, a newly created digital map database including road segments and vehicle cost values, created by the embodiments of the method described above.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 6 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.). As such, the navigation device 200 can receive and later store in memory 230, a newly created digital map database, created by the embodiments of the method described above.

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor 210, memory 230, etc. as previously described with regard to FIG. 5, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver. As such, the navigation device 200 can receive and later store in memory 230, a newly created digital map database, created by the embodiments of the method described above.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet. As such, the navigation device 200 can receive and later store in memory 230, a newly created digital map database created by the embodiments of the method described above.

The navigation device 200 may be provided with information (such as map database information in the form of a digital map application database for example, generated from the digital map source database created from a method of an embodiment of the present application discussed above from the server 302 via information downloads which may be periodically updated automatically (such as map or map database information for example) or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302. As previously indicated, the digital map source database may be created, by the embodiments of the method described above, in the server 302 or even, in at least one embodiment, within the navigation device 200 itself (assuming the digital map database stored in the navigation device includes known address points). Again, as would be understood by one of ordinary skill in the art, any of the techniques of embodiments of the methods of the present application described above, are equally applicable to the digital map database of the device or navigation device 200 discussed herein.

As indicated above in FIG. 5, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device, such as audio input/output devices for example.

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of embodiments of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, including molecular memory ICs, or any type of system or device suitable for storing instructions and/or data.

Embodiments of the present invention include a computer readable medium, comprising a map database. Again, as would be understood by one of ordinary skill in the art, any of the techniques of embodiments of the methods of the present application described above, are equally applicable to the map database of the computer readable medium discussed herein.

Stored on any one of the computer readable medium (media), embodiments of the present invention include software for controlling both the hardware of the general purpose/specialized computer or microprocessor, and for enabling the computer or microprocessor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the programming or software of the general/specialized computer or microprocessor are software modules for implementing the teachings of the embodiments of present invention. Embodiments of the present invention may be conveniently implemented using a conventional general purpose or a specialized digital computer or microprocessor programmed according to the teachings of the present disclosure, as will be apparent to those skilled in the computer art.

The foregoing description of the embodiments of the present invention has been provided for the purposes of illustration and description. It is not intended to be exhaustive or to limit embodiments of the invention to the precise forms disclosed. Many modifications and variations will be apparent to a practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS and GNSS, it should be noted that the navigation device may utilize any kind of position sensing technology as an alternative to (or indeed in addition to) GNSS (including GPS). For example the navigation device may utilize using other global navigation satellite systems such as the European Galileo system, the Russian GLONASS, the Chinese Beidou navigation system, the Indian IRNSS, etc. Equally, it is not limited to satellite based but could readily function using ground based beacons or any other kind of system that enables the device to determine its geographic location, such as using sensors, or via cell phone, WiMax or WiFi triangulation.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for determining a route of travel from a first location to a second location for a vehicle using a navigation device installed in the vehicle and comprising a memory, a processor communicatively coupled to the memory, and a display, wherein the memory stores a map database including information about a plurality of road segments of a digital map, and wherein the method comprises:
   retrieving a plurality of vehicle cost values, the retrieving including acquiring the plurality of vehicle cost values from the map database, the map database having at least one corresponding vehicle cost value associated with each road segment of the plurality of road segments, each vehicle cost value being representative of an expected energy or fuel consumption of a vehicle of a given type travelling along a corresponding road segment at a corresponding time of the day, wherein the vehicle cost values were computed based at least in part on information about trips made by one or more probe vehicles on road segments of the plurality of road segments, the information about the trips made by the one or more probe vehicles based on which the vehicle cost values were computed comprising information about average accelerations and jerks made by the probe vehicles while traveling on the road segments of the plurality of road segments;
   determining, by the navigation device, a selected route of travel from the first location to the second location from among a plurality of possible routes between the first location and the second location at a specified time of day, each possible route comprising a plurality of road segments, the determining comprising:
      calculating a total cost of each possible route based at least in part on data about the vehicle and the associated vehicle cost values for the specified time of day for each of the plurality of road segments in the possible route; and
      identifying, as the selected route of travel, the possible route having a minimum total cost, such that the selected route of travel has a lowest total expected energy or fuel consumption of the vehicle travelling between the first location and the second location; and
   outputting onto the display to a user of the navigation device the selected route of travel and vehicle operation information for the user to operate the vehicle along the selected route of travel to reduce the total expected energy or fuel consumption.

2. The method of claim 1, wherein the information about trips made by one or more probe vehicles on road segments of the plurality of road segments comprises information about elevations of the road segments of the plurality of road segments.

3. The method of claim 2, wherein the information about the elevations of the road segments of the plurality of road segments comprises average elevations of the road segments of the plurality of road segments.

4. The method of claim 2, wherein the information about the elevations of the road segments of the plurality of road segments comprises changes in elevation for the road segments of the plurality of road segments.

5. The method of claim 1, wherein the vehicle cost values were further computed based on information about road segment conditions for road segments of the plurality of road segments, the road segment conditions selected from the group consisting of: (i) a repair condition of the road segment; (ii) the material of the road segment; and (iii) a frictional coefficient of the road surface of the road segment.

6. The method of claim 1, wherein the vehicle cost values were further computed based at least in part on information about the one or more probe vehicles, the information comprising at least one of: a weight of the probe vehicle; a propulsion system in the probe vehicle; a type of the probe vehicle; a grade of fuel being used in the probe vehicle; a make of the probe vehicle; and a drag coefficient of the probe vehicle.

7. The method of claim 1, wherein the vehicle cost data is acquired from at least one of: (i) GNSS data about a probe vehicle; (ii) sensors on a probe vehicle; and (iii) an on-board diagnostic (OBD) connection of a probe vehicle.

8. The method of claim 1, wherein the identifying, as the selected route of travel, a possible route comprises identifying a possible route for which a total travel time does not exceed a fastest of the possible routes by more than a specified amount of time.

9. The method of claim 1, wherein the identifying, as the selected route of travel, a possible route comprises identifying a possible route for which a total travel distance does not exceed a shortest of the possible routes by more than a specified amount of distance.

10. The method of claim 1, wherein the determining the selected of the route of travel is based on additional data including at least one of weather data or traffic data.

11. A navigation device operable in a vehicle, comprising:
   a memory to store a map database, the map database including information about a plurality of road segments and at least one corresponding vehicle cost value associated with each road segment of the plurality of road segments, each vehicle cost value being representative of an expected energy or fuel consumption of a vehicle of a given type travelling along a corresponding road segment at a corresponding time of the day, wherein the vehicle cost values were computed based at least in part on information about trips made by one or more probe vehicles on road segments of the plurality of road segments, the information about the trips made by the one or more probe vehicles based on which the vehicle cost values were computed comprising information about average accelerations and jerks made by the probe vehicles while traveling on the road segments of the plurality of road segments;
   a processor communicatively coupled to the memory and configured to determine a selected route of travel from a first location to a second location from among a plurality of possible routes between the first location and the second location at a specified time of day, each possible route comprising a plurality of road segments, the determining comprising:

calculating a total cost of each possible route based at least in part on data about the vehicle and the associated vehicle cost values for the specified time of day for each of the plurality of road segments in the possible route; and identifying, as the selected route of travel, the possible route having a minimum total cost, such that the selected route of travel has a lowest total expected energy or fuel consumption of the vehicle travelling between the first location and the second location; and a display controlled by the processor to output the selected route of travel and vehicle operation information for a user of the navigation device to operate the vehicle along the selected route of travel to reduce the total expected energy or fuel consumption.

12. The device of claim 11, wherein the determining the selected route of travel is based on additional data including at least one of weather data or traffic data.

13. A non-transitory computer-readable medium which stores a set of instructions which when executed performs the method of claim 1.

* * * * *